US011262790B1

(12) United States Patent
Buxton et al.

(10) Patent No.: US 11,262,790 B1
(45) Date of Patent: Mar. 1, 2022

(54) LOW-PROFILE SMART MIRROR WITH BACKSIDE MOUNT

(71) Applicant: Delta Tech LLC, Lake St. Louis, MO (US)

(72) Inventors: Jonas Gray Buxton, Lake Saint Louis, MO (US); River Collins, Wentzville, MO (US)

(73) Assignee: Delta Tech LLC, Lake St. Louis, MO (US)

( * ) Notice: Subject to any disclaimer, the term of this patent is extended or adjusted under 35 U.S.C. 154(b) by 0 days.

(21) Appl. No.: 17/165,095

(22) Filed: Feb. 2, 2021

Related U.S. Application Data

(60) Provisional application No. 62/969,324, filed on Feb. 3, 2020.

(51) Int. Cl.
*G06F 1/16* (2006.01)
*A47G 1/02* (2006.01)
*A47G 1/16* (2006.01)
*G02B 5/08* (2006.01)

(52) U.S. Cl.
CPC ............. *G06F 1/1605* (2013.01); *A47G 1/02* (2013.01); *A47G 1/16* (2013.01); *G02B 5/0816* (2013.01); *G06F 1/1683* (2013.01); *G06F 1/1686* (2013.01)

(58) Field of Classification Search
CPC ...... G06F 1/1605; G06F 1/1626; G06F 1/166; G06F 1/1683; G06F 1/1686; A47G 1/02; A47G 1/16; G02B 5/0816
See application file for complete search history.

(56) References Cited

U.S. PATENT DOCUMENTS

| | | | |
|---|---|---|---|
| 4,202,607 A | 5/1980 | Washizuka et al. |
| 4,389,711 A | 6/1983 | Hotta et al. |
| 4,605,292 A | 8/1986 | McIntosh |
| 4,848,542 A | 7/1989 | Burnette et al. |
| 4,950,065 A | 8/1990 | Wyman |
| 5,481,616 A | 1/1996 | Freadman |
| 5,988,582 A | 11/1999 | Olivo |

(Continued)

OTHER PUBLICATIONS

MagicMirror[2] [online]. Magic Mirror, Jan. 28, 2020. Retrieved from the Internet: <URL: https://magicmirror.builders/>.

(Continued)

*Primary Examiner* — Adrian S Wilson
(74) *Attorney, Agent, or Firm* — Creativenture Law, LLC; Dennis J M Donahue, III; Kevin Staed (57) ABSTRACT

A smart mirror attaches directly to a larger mirror, window pane, or other base structure in a fashion meant to appear as low profile as possible, meaning the smart mirror extends a very short distance outward from the mounting surface of the base structure, and there are no visible attachment devices. The smart mirror appears to be a part of the surface upon which it is mounted and appears to blend in seamlessly when the base structure is a mirror. Additionally, the smart mirror is easy to install onto the base structure with thin adhesive gel pads that leave behind no residue and are completely reusable. This enables the user to mount the device onto any smooth surface and to be able to easily move the device when desired. The smart mirror does not have any integral, built-in camera or microphone, but can be added as separate add-on peripheral modules.

20 Claims, 8 Drawing Sheets

(56) References Cited

U.S. PATENT DOCUMENTS

| | | | |
|---|---|---|---|
| 6,560,027 | B2 | 5/2003 | Meine |
| D492,493 | S | 7/2004 | Dretzka |
| 6,790,046 | B2 | 9/2004 | Haffenden et al. |
| D506,877 | S | 7/2005 | Snell |
| 6,993,129 | B1 | 1/2006 | Barr |
| 6,996,031 | B1 | 2/2006 | Cripe |
| 7,151,515 | B2 | 12/2006 | Kim et al. |
| 8,099,247 | B2 | 1/2012 | Mischel, Jr. et al. |
| 8,905,560 | B1 | 12/2014 | Zadro |
| 9,568,950 | B2 * | 2/2017 | Christie, II ............. F16M 13/02 |
| 9,628,131 | B2 * | 4/2017 | Thompson ........... H04B 1/3888 |
| 9,648,217 | B2 | 5/2017 | Kaiser |
| 9,699,539 | B2 | 7/2017 | Iori et al. |
| 9,901,193 | B2 | 2/2018 | Nikolov et al. |
| 9,924,809 | B2 | 3/2018 | Forrest et al. |
| 9,970,475 | B2 * | 5/2018 | Chang .................. A47B 95/008 |
| 10,142,592 | B1 | 11/2018 | Van Ness |
| 10,157,591 | B2 | 12/2018 | Kim |
| 10,278,479 | B2 * | 5/2019 | Friedman ................ A47G 1/17 |
| 10,318,145 | B2 | 6/2019 | Broxson |
| 2002/0196333 | A1 | 12/2002 | Gorischek |
| 2012/0194998 | A1 * | 8/2012 | McClure ............... G06F 1/1626 361/679.56 |
| 2013/0344917 | A1 * | 12/2013 | Sobti ..................... G06F 1/1632 455/557 |
| 2014/0172557 | A1 | 6/2014 | Eden et al. |
| 2014/0319083 | A1 | 10/2014 | Stark |
| 2018/0199695 | A1 * | 7/2018 | Friedman ................. A47G 1/04 |
| 2020/0037731 | A1 * | 2/2020 | Friedman ................. A47G 1/16 |
| 2020/0068273 | A1 * | 2/2020 | Putnam .................. A61B 5/024 |
| 2020/0248864 | A1 * | 8/2020 | Dickinson ................ A47G 1/16 |
| 2021/0046885 | A1 * | 2/2021 | Jankura ................. F16M 13/02 |
| 2021/0149451 | A1 * | 5/2021 | Allen ....................... H02G 3/10 |
| 2021/0165445 | A1 * | 6/2021 | Durant ................. G06F 1/1624 |
| 2021/0291033 | A1 * | 9/2021 | Putnam .................. A61B 5/743 |

OTHER PUBLICATIONS

Mirror Glass screen Protector [online]. Ebay, Feb. 2, 2021. Retrieved from the Internet: <URL: https://www.ebay.com/i/192669648226?chn=ps&var=492809765370&norover=1&mkevt=1&mkrid=711-117182-37290-0&mkcid=2&itemid=492809765370_192669648226&targetid=537215822808&device=c&mktype=pla&googleloc=1020476&campaignid=1881946464&mkgroupid=70435645632&risatarget=pla-537215822808&abcId=1139336&merchantid=1131120088gclid=EAIaIQobChMIj6KL1oe__4wIVy8DACh1uyQ7nEAQYAyABEgLf0_D_BwE.

* cited by examiner

LOW-PROFILE SMART MIRROR WITH BACKSIDE MOUNT

CROSS-REFERENCE TO RELATED APPLICATIONS

This application claims priority from U.S. Provisional Pat. App. No. 62/969,324 filed on Feb. 3, 2020, which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to smart mirrors, and more particularly to low-profile smart mirrors that can be attached onto a portion of a larger mirror.

Related Art

Smart mirror display technology has been known for over forty (40) years as evident from U.S. Pat. No. 4,202,607 by Sharp Corporation ("Sharp Kabushiki Kaisha"). Soon after smart mirror technology had arrived, Hitachi received a patent for a touch sensitive tablet computer, U.S. Pat. No. 4,389,711. Although the market for tablet computers has grown tremendously in the past couple of decades, during this same period of time, the adoption of smart mirror technology has been slow with its popularity only growing marginally. There are a number of market factors that cause this disparity in the popularity of tablet computer products over smart mirror products, and some of the reasons for the disparity relate to the portability of tablet computers and their connectivity to other computers which allow users to either use them with their other personal computers or to use them on their own, and the purchasing decision for these tablet computers takes into account the very many ways that any type of computer can be used and the particular portability and connectivity benefits of the tablet computers are considered for their use at home, for school work, in field work, and/or at the office. In comparison, whereas a tablet computer buying decision is based first on its use as a computer and then the benefits of its portability and connectivity are considered, many smart mirror products are positioned to replace "dumb mirrors" (i.e., standard mirrors without any electronics in them) which in many cases are fixed and can be rather large full-length mirrors and bathroom mirrors so the buying decision is primarily for the functionality of a mirror and only secondarily is there a question about the smart mirror technology.

Many current smart mirrors are designed to be standalone units that would require users to replace their existing mirror, and may require extensive renovations and installation operations in order to use the new smart mirror system. When users consider the significant cost of the smart mirror relative to the limited added value of the smart mirror technology as compared to the primary benefit of their existing mirror, most users decide that they will stick with a standard mirror and will just lean their tablet computer up against their existing mirror or add a mount to their current mirror that can hold their tablet computer or smart-phone in place. Even when a person is making a buying decision for new mirrors, such as when buying or remodeling a salon business or a bathroom in a home or business, the limited added value of current smart mirrors does not outweigh the large cost differential between standard mirrors and smart mirrors of the same size. When considering that mounting mechanisms for tablet computers and smart-phones have become so ubiquitous and cost so little combined with the fact that using a mount to temporarily hold the tablet computer or smart phone on a mirror is a satisfactory option for most users, many users merely choose the less expensive option of the tablet or smart-phone mount attached to a standard mirror. Even if the cost of smart mirrors are eventually brought down to being a little more than the cost of similarly sized standard mirrors, people know that they would have to remove their currently existing standard mirror in order to replace it with the smart mirror, and this would continue to present a significant hurdle to the buying decision for smart mirrors.

It will be recognized that the mirrors most often used by people are typically in locations where people want privacy, and it is well known that there have been significant problems with hackers surreptitiously gaining unauthorized remote control over the cameras and microphones in computers, including tablet computers. Accordingly, many people understandably do not want to have a tablet computer even temporarily mounted to any mirror that is in a private place like their home bathroom or semiprivate locations like public restrooms, locker rooms and showers, or salons because of privacy concerns. In fact, due to privacy concerns, most gyms and many restaurants, clubs, and salons prohibit any use of a smart-phone or tablet computer while using the locker room facilities, public restrooms, and other semiprivate facilities in these locations. People do not like the risk of having some hacker in a remote location spying on them and/or recording them and sharing their private times, or their semiprivate discussions while in a salon or their workouts while in a gym, especially when done without their knowledge or permission.

When considering the cost concerns and the privacy concerns associated with smart mirrors, the reason that they have not become more popular nor widely adopted actually becomes more apparent. Therefore, rather than incurring the cost of replacing current standard mirrors with a smart mirror, the incremental value of a smart mirror may be better realized by attaching a smaller smart mirror to a larger standard mirror. Additionally, while people may want the capability to have the functionality of a camera and microphone with a smart mirror, the value of this functionality cannot be at the cost of their privacy. Accordingly, there remains a need for a smart mirror that provides the technological benefits of connectivity with the internet and possibly other local computers, including smart TOT devices while also having a corresponding cost that matches the incremental value of the smart mirror over a standard mirror. The smart mirror must also be easy to install because people will not buy it if they need to replace their existing mirror fixtures or it is otherwise too difficult to install. Additionally, even though people want the connectivity of the smart mirror with the internet, for most people and many installations, they demand that the smart mirror must be completely protected from remote activation of a camera and microphone or from a video or audio recording being made of them when they are in front of the smart mirror or are within earshot of the smart mirror.

Even if someone had taken a tablet computer, added a flat mount to the back and a mirrored surface on the front to create a low profile smart mirror, such a device would not be satisfactory to most users because it would necessarily have a camera and a microphone. Even if the creator of such a tablet computer smart mirror would use available software to disable the camera and microphone, it would still not be acceptable to many users because they know that the software can be remotely accessed and hacked to surreptitiously activate the camera and/or microphone so they could not be absolutely certain whether or not such viewing, listening, and recording devices have been activated. Therefore, there remains a need for a low profile smart mirror that is impossible to remotely view or hear a user with a live action connection or to record the images or sounds of a user, even if the device gets hacked. Users have indicated that if they could be assured of a totally secure way to only use a camera and a microphone when they want to use it, even if the device gets hacked, they may choose such an option.

There have continued to be attempts to make smart mirrors attractive to users, but they mostly suggest increasing the technology incorporated into the systems and usually include frames or other borders around the mirrors. Additionally, the prior art smart mirrors continue to be suggested as a replacement for existing standard mirrors or have complicated connection mechanisms for attaching the smart mirrors to a larger fixture. For example, U.S. Pat. No. 10,142,592 describes a large touchscreen-enabled smart mirror mounted on at least one frame and can support large-screen video chats with the participant being provided full-size on the smart mirror's screen, and when not in video chat mode, a camera creates a mirror effect on the smart mirror's screen. In another example, U.S. Pat. No. 6,560,027 discloses a smart mirror that is designed to be fixed in place rather than having connectors that would allow it to be placed over a larger mirror; in a power off mode, the smart mirror acts as a standard reflective mirror, and in a power on mode, the smart mirror becomes a display device. Although the '027 Patent predates most smart-phones and video phone telecommunications, it teaches that a communications card is adapted to couple the smart mirror's computer system to a telephone network and suggests that the smart mirror can interact with personal data assistant (PDA) devices which, at the time of the '027 Patent, had been known to include microphones and cameras, and allowed for two-way communication with the introduction of the BlackBerry 957 in April 2000. Accordingly, smart mirror described by the '027 Patent suffers from both problems described above because it teaches a standalone smart mirror that is mounted in a room or otherwise coupled to a building wall rather than having connectors that would allow it to be placed over a larger mirror, and it could be compromised so that it allows someone to remotely and surreptitiously listen in on private conversations and/or record the private conversations.

BRIEF DESCRIPTION OF THE DRAWINGS

The present invention will become more fully understood from the detailed description and the accompanying drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
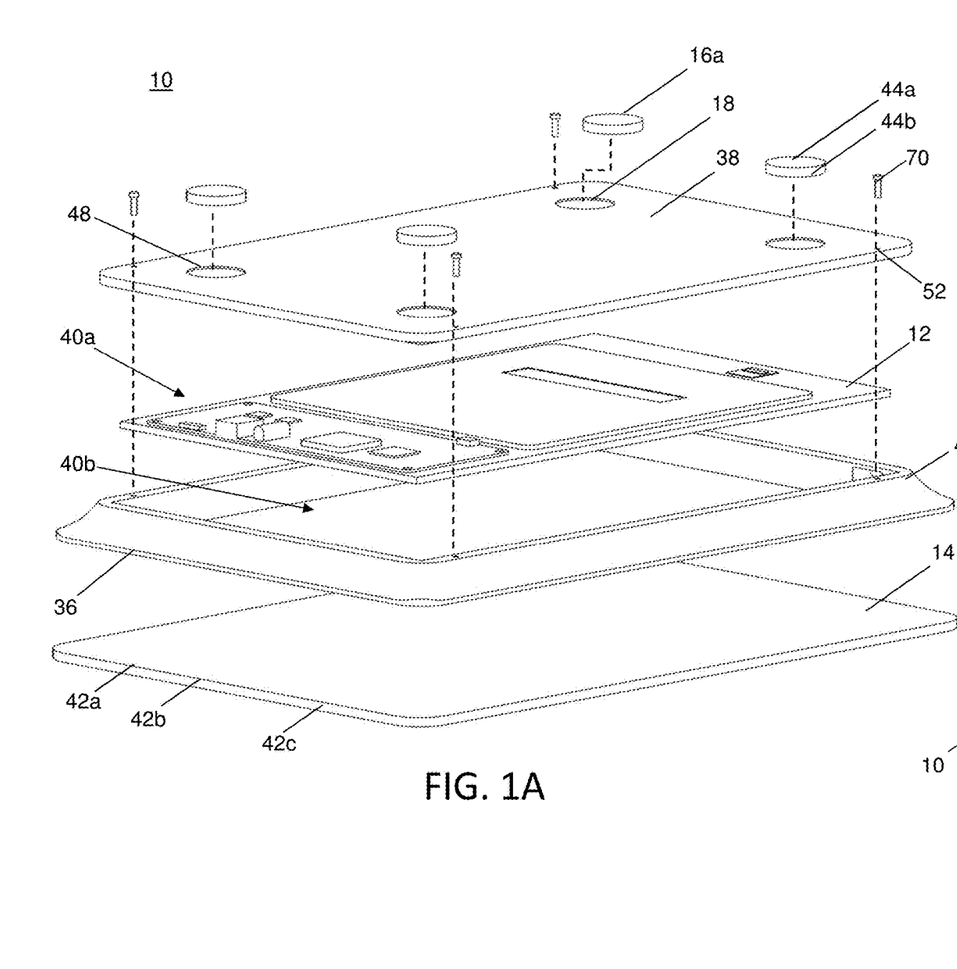
FIG. 1A is an exploded perspective view of a smart mirror according to the invention described herein.
Figure 1B:
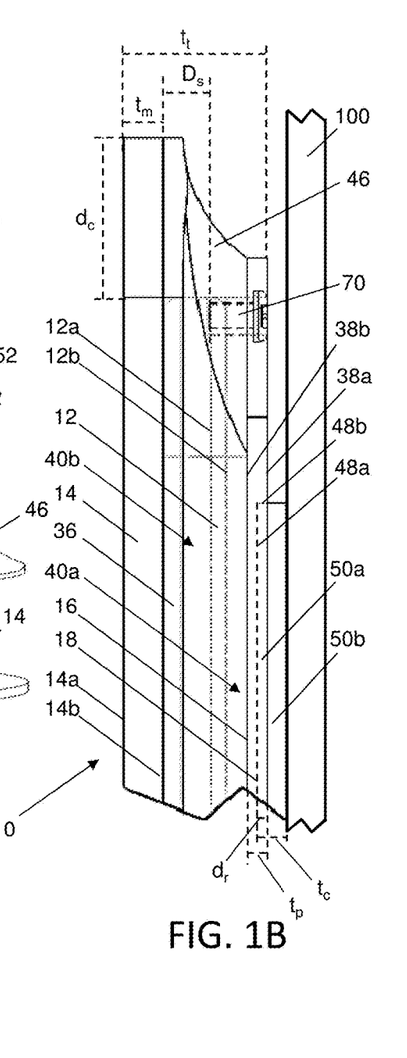
FIG. 1B is a detail side view of the smart mirror according to the invention described herein.
Figure 1C:
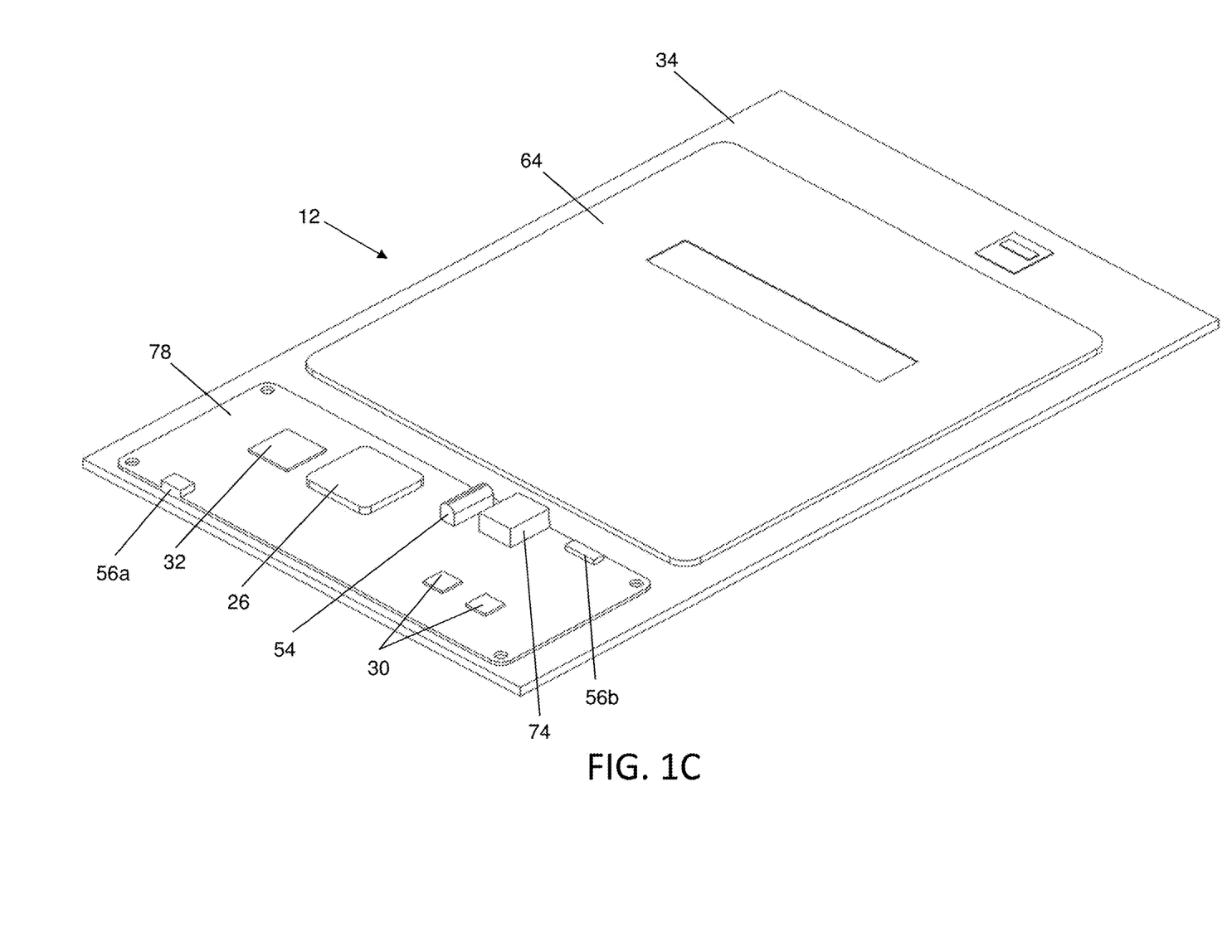
FIG. 1C is a detail perspective view of the display and control board for the smart mirror according to the invention described herein.
Figure 2A:
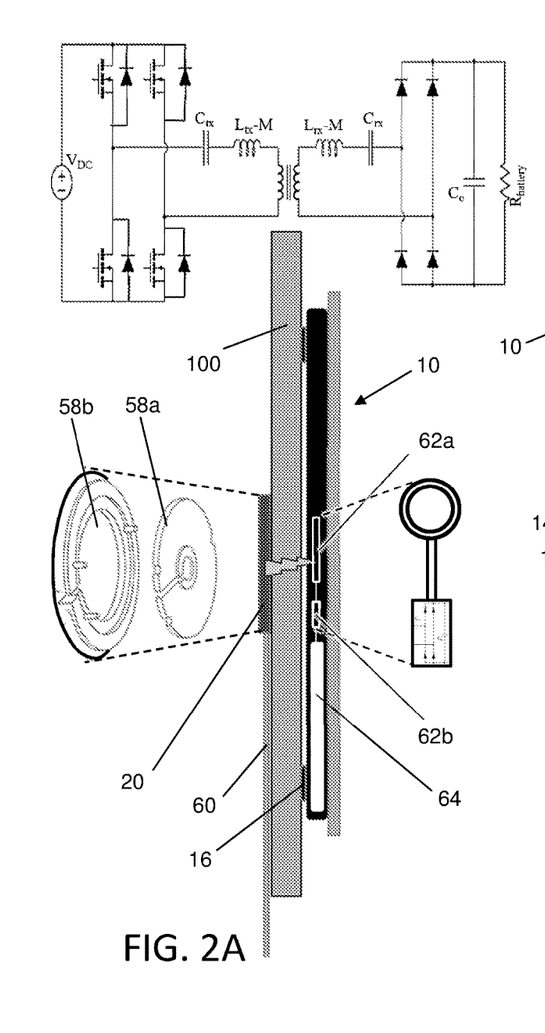
FIGS. 2A-2C are side views of alternative mountings for the smart mirror according to the invention described herein.
Figures 2B, 2C:
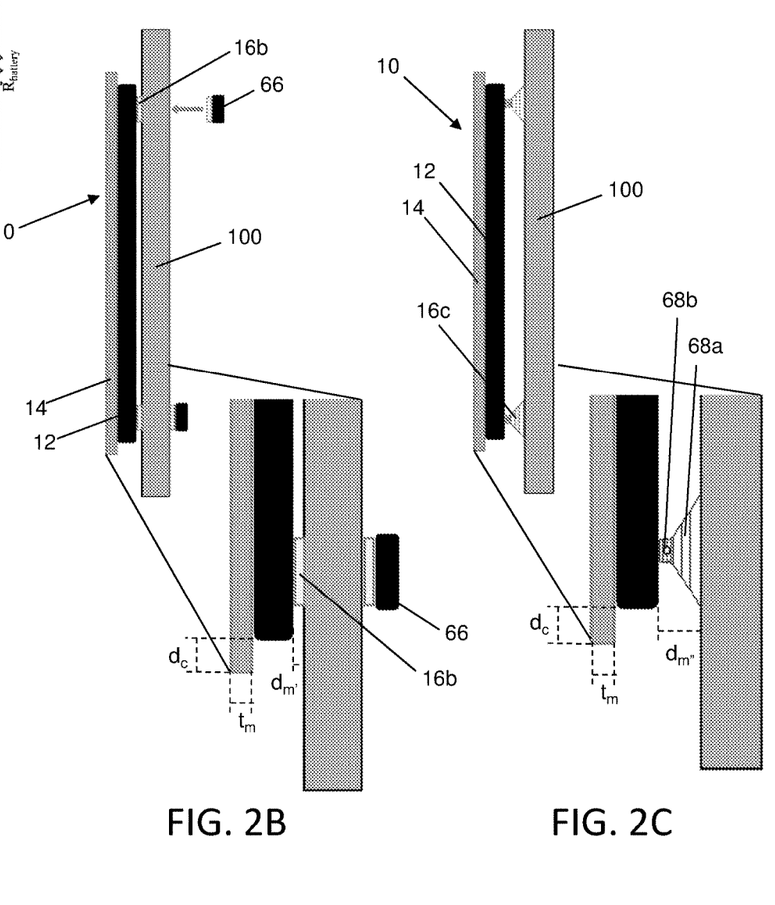

As described below and shown in the accompanying drawings, the present invention is a low-profile smart mirror 10 for connection to the front side 105 of a larger mirror 100 or any other base structure with a smooth front side. The smart mirror is formed by a unique configuration of a tablet computer 12 and a mirror 14 with one or more connectors 16 and fasteners 18 that attach the smart mirror to the larger mirror. In the preferred embodiment shown in FIG. 1A, the connector is an adhesive gel pad that acts like micro suction cups, and may be sold under different brand names, such as Fixate Gel Pads, Stikk Gel Pads, Alien Tape, and Airstick Microsuction Tape. The outward-facing side of the adhesive gel pad releasably attaches to the larger mirror while the inward-facing side is preferably permanently attached to the back of the smart mirror by the fastener which is preferably a layer of adhesive. Preferably, adhesive gel pads are attached to the backside panel near the corners of the tablet computer. The backside panel may have recessed regions where the adhesive gel pads are attached to reduce the portion of the pads that extend outward from the backside panel. As explained in detail below, other than the adhesive gel pads, there are several different types of reusable, low-profile connectors that can be used to releasably attach the smart mirror to the base structure. Generally, as shown in FIG. 1B, each of the low-profile connectors has a thickness ($t_c$) between the outward-facing side and the inward-facing side that is less than the thickness of the tablet computer ($t_c < t_t$) which helps the smart mirror of the present invention have a very low-profile with the distance ($d_m$) between the front side of the smart mirror and the front side of the larger base mirror being approximately a half of an inch ($d_m \approx \frac{1}{2}$). Preferably, as shown in FIGS. 1B and 2B, the thickness of the connector is less than the thickness of the mirror ($t_c < t_m$).

The tablet computer 12 has a motherboard 78 with a processor 26, a power supply 28 in electrical connection with the processor, an external communications module 30, a memory 32, and a display screen 34 in operative communication with the processor. The power supply is preferably a rechargeable battery 64 that is operatively connected to the processor and an integral speaker 54 for operations and to the power source for charging. The front 12a of the display screen faces towards a front surface 36 of the tablet computer, and the rechargeable battery and motherboard are preferably attached to the back 12b of the display screen. The tablet computer also has a backside panel 38 fastened to the front surface which holds the display screen in place and encloses the processor and memory in an interior space 40a behind the display screen. The external communications module preferably connects to computer networks 110 either through a wired interface, such as with a USB cable, coaxial cable, fiber optic cable, twisted pair cable, or any other physical cable and/or through a wireless interface, such as WiFi, mobile broadband, cellular, Bluetooth, or any other transmission of data using electromagnetic waves, such as radio waves and light waves. A wireless interface is preferred, and if a wired interface is also used, such as for an add-on module as described below, a USB cable is preferred because it contains both data pins and power pins in the same cord. To ensure the privacy of the user while the tablet computer is communicating with the computer network, the tablet computer does not include any device which could be used to record users of the tablet computer or transmit live pictures or sound so it does not have an integral, built-in camera module or an integral, built-in microphone module. Instead of incorporating these outward-bound communication devices as integral components of the tablet computer, the tablet computer preferably includes at least one peripheral port 56 for a plugin peripheral camera 22a and/or a plugin peripheral microphone 22b.

The mirror 14 is attached to the tablet computer and is disposed in front of the display screen. Although the mirror can be in contact with the display screen or could even be attached directly to the display screen, the mirror is preferably spaced a distance ($D_s$) from the display screen so that there is an open space 40b between the mirror and the front of the display screen. The mirror is a two-way mirror with a transparent protective layer 42c on the front 14a and a base layer 42a and a semi-transparent reflective layer 42b at the back 14b. The mirror extends over the entirety of the display screen and does not have any border or other frame around its periphery. The mirror's periphery is preferably cantilevered beyond the display screen's periphery by a distance ($d_c$) that is greater than the thickness of the mirror ($d_c > t_m$) as shown in FIG. 2B and can be greater than the thickness of the tablet computer ($d_c < t_t$) as shown in FIG. 1B. The tablet computer may have a frame 46 or housing fastened to the backside panel with fasteners 70 (screws or M2 bolts) through apertures 52 therein beyond the periphery of the tablet computer's circuit board. The frame surrounds the display screen and extends forward to space the mirror away from the display screen and is preferably attached to the back of the mirror so there is no border or frame structure around the periphery of the mirror. Preferably, the transparent protective layer is acrylic, although it can be glass or any other transparent material that is preferably rigid or semi-rigid, although the transparent material could be flexible, such as a sheet of polyethylene terephthalate (PET).

The smart mirror's tablet computer is preferably powered by a rechargeable battery 64 that may be powered through a USB cable 60 that is friction fit and/or magnetically secured to a physical peripheral port 56a and is connected through a power cord to an AC/DC adapter that is plugged into a standard alternating current (A/C) outlet. Alternatively, the rechargeable battery may be charged by an inductive charger 20 shown in FIG. 2A. The inductive charger operates with direct current (DC) and has a primary induction coil 58a controlled by a transmitter circuit 58b and can be powered through a USB cable 60 or a standard jack connected through a power cord to an AD/DC adapter in a standard A/C outlet. The inductive charger may be placed behind the larger mirror or other base structure to help hide the power cord, or it may be attached to the front side of the base structure if it is thin enough to fit between the tablet computer's backside panel and the front of the base structure. For inductive charging of the rechargeable battery 64, the tablet computer has a secondary coil 62a and a receiver circuit 62b. Since the secondary coil must be substantially adjacent to the primary coil for the inductive charging to take place, and the smart mirror is designed to be moveable with its releasable adhesive gel pads, it is easy to place the smart mirror over the inductive charger when it is on the front surface of the base structure. However, when the inductive charger is mounted to the back surface of the base structure, such as behind the larger mirror, it may be helpful to have a specified mounting location for the smart mirror. For example, as shown in FIG. 2B, a magnetic connection between a ferromagnetic material attached to the base structure, preferably on the back side although it could be on the front, and a magnetic connector attached to the tablet computer's backside panel would help the user align the secondary coil with the primary coil. If the preferred adhesive gel pads are used as the connector described below, it is still possible to attach one or more magnets to the tablet computer to help with the alignment.

A connector 16 is provided to attach the smart mirror to the larger mirror or other base. The connector includes an outward-facing side 44a abutting the base when attached and an inward-facing side 44b connected to the outer-facing surface 38a of the backside panel, opposite from the frame and computer proximate to the inner-facing surface 38b of the backside panel. As further explained herein, various connectors may be used including but not limited to adhesive gel pads 16a, magnets and ferromagnetic materials 16b and suction cups 16c. The preferred adhesive gel pads are shown in FIGS. 1A and 1B and are seated within recesses 48 in the backside panel but it will be appreciated that the connectors could also be directly attached the outer-facing surface of the backside panel or integrate therewith. The recesses within the backside panel have recessed surface 48a surrounded by a sidewall 48b in the preferred embodiment with the recessed surface recessed a depth ($d_r$) from the backside panel. The depth is less than the thickness of the backside panel ($t_p$), preferably less than half the thickness of the backside panel ($d_r < \frac{1}{2} t_p$), and is also preferably less than the thickness of the connector ($d_r < t_c$). Accordingly, a portion 50a of the connectors are situated within the respective recesses and another portion 50b of the connectors protrude out from the recesses and the distance between the smart mirror and the base is reduced, resulting in an even lower-profile mirror. Furthermore, it will be appreciated that the depth of the recess and width of the connector could be engineered such that when connected, the outward-facing side of the connector is flush with the backside panel and the outer surface of the backside panel is thereby flush with the base with the entirety of the connector situated within the recess. In addition the connector could be held within the recess by any number of fastening means including but not limited to a friction fit, an adhesive and a mechanical fastener.

Relatively flat magnets, such as high-strength magnets (A-magnets) may be attached to the backside panel at the same general locations as the adhesive gel pads. Additional magnets (B-magnets) or ferromagnetic materials 66 are attached to either the front or the back of the base structure and are used to pair up with each of the magnets attached to the backside panel. The magnetic attraction between the magnets or the magnets and ferromagnetic materials holds the smart mirror display in place. Whenever the user wants to move the smart mirror, all they would have to do is lift or slide the smart mirror to break the magnetic connection. The thickness of the magnets can be equivalent to the thickness of the adhesive gel pads which results in the smart mirror being spaced from the larger mirror by an equal distance ($d_{m'}$) regardless of whether adhesive gel pads or magnets are used. If a layer of magnetic layer or a layer of a ferromagnetic material that is approximately the same size as the backside panel is attached to to the front of the base structure, this layer of material could have a mirrored film laminated to its front surface so that when the smart mirror is removed from a base structure, there is still a mirror surface at the same location as the smart mirror.

Figure 3A:
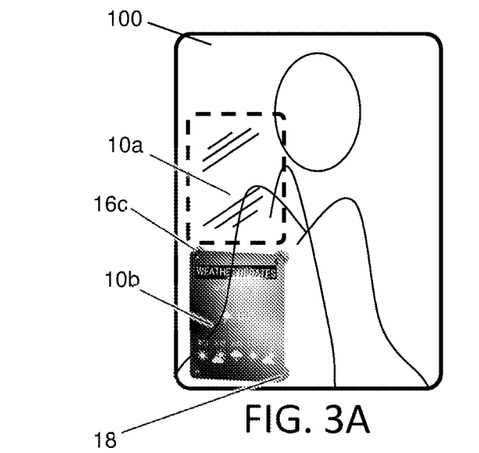
FIG. 3A is a front perspective view of a smart mirror connected to a larger mirror according to the invention described herein.

Suction cups are another type of reusable, low-profile connector that can be attached to the backside panel in the same general locations as the adhesive gel panels. As shown in FIG. 2C, the suction cup has a diaphragm 68a whose convex outward-facing side is releasably attached to the base structure. A post 68b extends from the convex side and is held by a bracket aperture in the tablet computer's backside panel. As shown in 2C, preferably no fastener extends through the tablet computer to the front of the mirror. However, as shown in FIG. 3A, it is also possible for a fastener 18, such as a screw, to extend through the tablet computer and the mirror to attach the suction cup to the smart mirror structure. Generally, the use of suction cups with the posts would cause the tablet computer to be spaced a greater distance from the base structure as compared to the adhesive gel pads and magnets which would result in the smart mirror being spaced from the larger mirror by a distance ($d_{m''}$) that is slightly thicker greater than the distance when the adhesive gel pads or magnets are used. ($d_{m''} > d_{m'}$). For example, the distance when a suction cup is used is approximately between an inch and an inch and half ($1'' < d_{m''} < 1\frac{1}{2}''$) as compared to the half of an inch space discussed above. However, it will also be appreciated that the suction cup does not necessarily require a post and a flattened portion of its convex side can be directly adhered to the backside panel in which case the distance between the smart mirror and the base with suction cup connectors would be equivalent to the distance when adhesive gel pads or magnets are used ($d_{m''} \approx d_{m'}$).

Another example of a stronger type of suction cup that could be used as a connecter is a lever actuated suction cup which has an aperture disc over the diaphragm, such as described and shown in U.S. Pat. No. 3,750,991 which is incorporated by reference herein. Although it would be more complicated, it could be possible to connect the suction cup's lever to the backside panel so that when a user pulls the smart mirror away from the base structure, the backside panel pulls the lever back away from and freeing the aperture disc which then allows the diaphragm to release from the front surface of the base structure. Similarly, when the user wants to secure the smart mirror to the base structure, the backside panel would push the lever forward to lock the aperture disc over the diaphragm as the diaphragm is pressed against the front surface of the base structure. There are other types of suction cups that could be used but would likely increase the cost of the smart mirror so they are not preferred. For example, a larger number of small suction cups could be used, such as described and shown in U.S. Pat. No. 2,466,502 which is incorporated by reference herein. As yet another example, a suction cup with vacuum control could be used, such as described and shown in U.S. Pat. No. 3,152,828, which is incorporated by reference herein.

Other types of low-profile connectors include adhesive synthetic setae, hook and loop fasteners, and even double-sided adhesive strips. Adhesive synthetic setae is a dry adhesive layer that is self-cleaning and acts like the setae in the feet of geckos so they are reusable and are sold under different brand names, such as GeckSkin and ShearGrip. The adhesive synthetic setae have nanoscale spatulae that adhere to surfaces by van der Waals forces and not by any vacuum or air pressure, and they are applied to various flexible carrier materials. The other side of a layer of adhesive synthetic setae can be attached to the backside panel with a layer of adhesive. Flexible carrier strips of different thicknesses can be used for the adhesive synthetic setae which can have a thickness less than the adhesive gel pads. Hook and look fasteners, such as the well-known Velcro brand, are also reusable and releasable, but their use would require one layer of the hook and loop fastener to be attached to the backside panel, such as with a layer of adhesive, while the other layer of the hook and loop fastener is attached to to the front face of the base structure.

As evident from the description of the preferred embodiment of the invention and alternative variations, the low-profile smart mirror has a releasable and reusable connection that preferably directly attaches the smart mirror to any location on the base structure and at any orientation within a plane that is parallel to the base structure. This allows the smart mirror to be placed anywhere on the base structure and relocated as desired without having to adjust anything on the base structure. In some embodiments, such as with the magnets and the hook and loop fasteners, the location of the smart mirror will be limited to the locations on the base structure where the other sides of these connections are attached. Similarly, for users who do not care to vary the location or orientation of their smart mirror when it is on the base structure, it would also be possible to attach a bracket to the base structure or to attach multiple brackets to different base structures. The mounting bracket itself could have a mirrored front face, and the smart mirror could releasably connect to the mounting bracket by a snap-fit connection around the sides of the smart mirror's housing or by a slide on connection with side grooves and a bottom lip that receives the sides of the smart mirror's housing.

It will be appreciated that the tablet computer could have a modular structure. For example, the frame 46 and the backside panel 38 with the fasteners 18 could form one unit that is mounted to the larger mirror by the connectors 16 and would serve as a bracket module for the smart mirror's tablet computer 12 and mirror 14. In this embodiment, the tablet computer could have a completely separate housing from the bracket module with a snap-fit connection. It will also be appreciated that the mirror could either be a part of the bracket module or it could be connected to the smart mirror. As a part of the bracket module, the smart mirror could have any type of releasable connection to the frame, such as a snap fit, a friction fit groove, magnetic fasteners, or even a hinge on one side and a snap or magnetic fastener on an opposite side which would allow a user to place the tablet computer into the open space 40b within the frame when the mirror is moved away from the frame and then place the mirror back over the frame to secure the tablet computer within the bracket module. Although a mounting bracket is a possible addition to the present invention, it is not necessary and is less preferred. Instead; the reusable and releasable connections that have the direct attachment to the base structure are most preferred because they allow for a versatile placement and orientation of the low-profile smart mirror on the base structure without having the additional structure, cost, and weight of different modules. The modular smart mirror version of the present invention may be more advantageous in some niche uses, such as where a user wants their same smart mirror while at their home and at their workplace, such as a salon, gym, or office, and they can mount a bracket module at each location to have the ease of merely bringing the tablet computer portion of the smart mirror between the locations.

Double-sided adhesive strips can be considered releasable, but they are usually not reusable so they would be considered more of a semi-permanent attachment which would make it more difficult to move the smart mirror from one location to another. Additionally, when double-sided adhesive strips are removed, they can leave an adhesive residue on the base structure so although they are very low-profile, they are not the preferred low-profile connection. Generally, double-sided adhesive strips have an adhesive layer on one side of a carrier layer and another adhesive layer on the other side of the carrier layer and are not reusable. The carrier layer can be a tape or some other webbing that may be thicker than tape, such as a foam or a fabric. If double-sided adhesive strips are used, it would be preferable that the inner layer of adhesive is fixed to the backside panel and the outer layer of adhesive is covered by a peel-away strip until it is ready to be fixed to the larger mirror. Although the preferred embodiment has a backside panel which spans across the entire back of the tablet computer's housing, it will be appreciated that the backside panel could be limited in size to extend between the frame in sections at locations where the connectors are attached or otherwise fastened to the smart mirror.

An exemplary installation of two versions of the low-profile smart mirror over a larger standard mirror is shown in FIG. 3A and illustrates the smart mirror being used in a salon setting. The low-profile smart mirror on the top 10a is representative of the most flat connections, such as the adhesive gel pads and the adhesive synthetic setae, and appears to be a part of the surface upon which it is mounted. These most flat connections result in a smart mirror that has the very low-profile thickness described above, i.e., approximately around a half of an inch ($d_m \approx \frac{1}{2}"$), and when this smart mirror's display is turned off, as shown in FIG. 3A, it blends in almost seamlessly to the base mirror. The low-profile smart mirror on the bottom 10b has its display turned on and has suction cup connections that result in the smart mirror being slightly further from the base as described above, i.e., an inch and an inch and half ($1"<d_{m"}<1\frac{1}{2}"$). Even with this slightly greater distance between the front surface of the smart mirror and the front surface of the base, the smart mirror blends in with the base mirror sufficiently such that it does not detract from the functionality of the base mirror and remains aesthetically pleasing when its display is turned off as well as when its display is turned on.

Figure 4A:
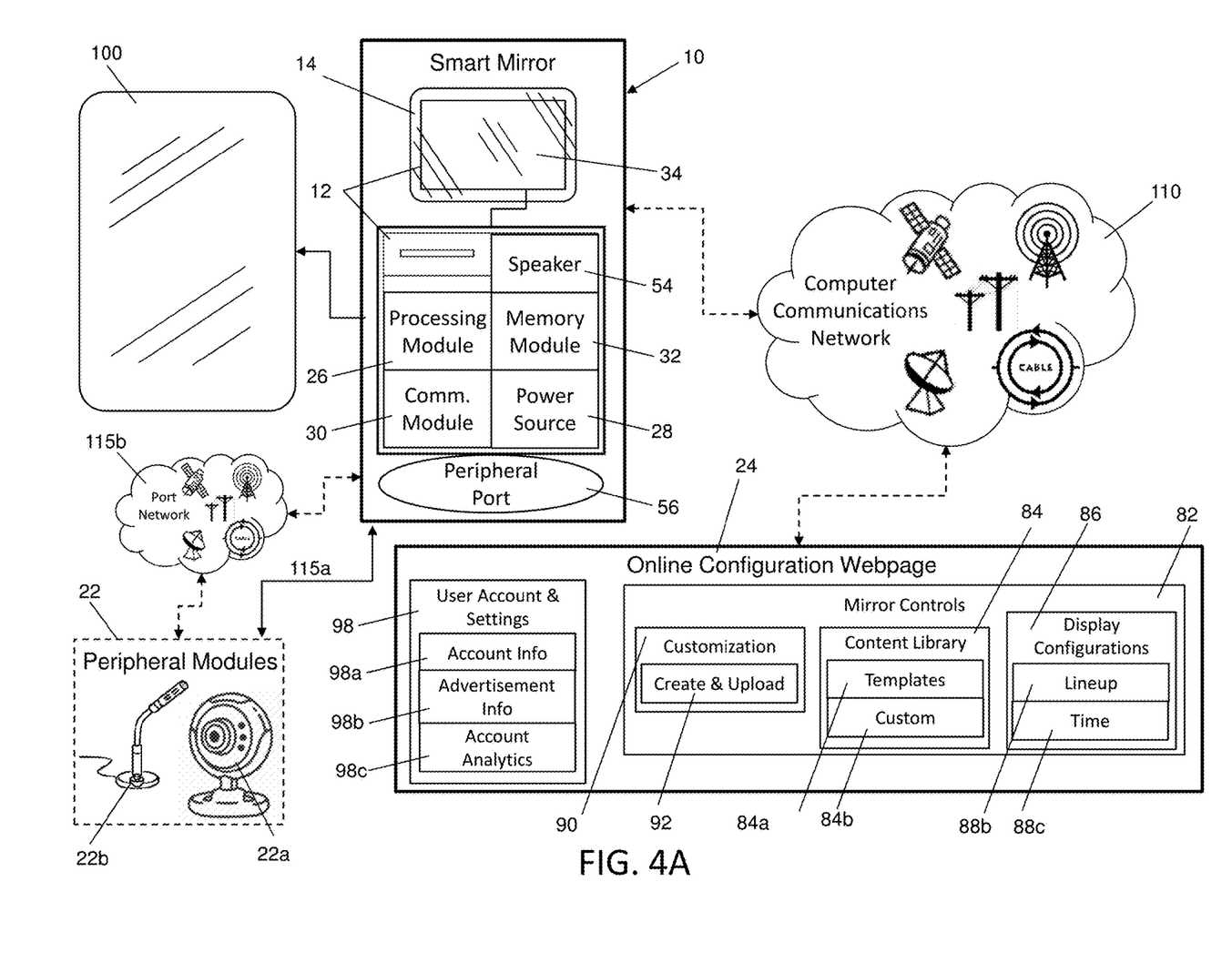
FIG. 4A shows a schematic diagram of the smart mirror and user portal software application according to the invention described herein.

As indicated in the background section above, in private and semiprivate locations, people want to be assured that they have privacy and that electronic devices are not recording or transmitting their images and their voices without their knowledge and permission. To ensure this privacy the tablet computer does not have any integral, built-in camera or microphone; instead, the external communications module is preferably configured with either the physical peripheral port 56a and a wireless peripheral port 56b that can be used to connect a plugin peripheral camera 22a and/or a plugin peripheral microphone 22b to the tablet computer. The wireless port is preferably used for networked communications over a computer network 110 as shown in FIG. 4A. Users may want to incorporate the functionality that a camera and/or microphone would add to their smart mirrors, and in such a case, the users can physically add a peripheral module 22 to the device, such as the plugin peripheral camera module described and shown in U.S. Pat. No. 6,790,046 and the plugin peripheral microphone and speaker module described and shown in U.S. Pat. No. 5,481,616 which are incorporated by reference herein. The peripheral port 56a, 56b can be used for the tablet computer to communicate with the camera and/or microphone add-on peripheral module in a non-networked communication 115 through a wired connection 115a through the wired peripheral port, such as through a USB connector, or it through a wireless connection 115b, preferably through a local wireless communication such as WiFi or Bluetooth communication protocol. Although the wireless communication could be networked communications over the internet, such as with any internet-of-things (TOT) protocol, rather than the local non-networked communications (wired or wireless), the networked communications could be more susceptible to hacking so the non-networked communication is preferred. In a networked configuration, the camera and/or microphone peripheral module can be used to perform all of the functionality of the integral, built-in camera and microphone, such as taking pictures, AI-enabled facial recognition, AI-enabled voice command recognition, videophone communication, etc. It is also possible for the tablet computer to require a wireless communication add-on module in order for the tablet computer to function over a wireless communications network. Further, it is possible for the add-on peripheral module to be any other peripheral device, such as a wireless inductive power module or a solar charging module.

The safest operation of the device would be to only insert the camera module, the microphone module, or a camera and microphone module when the user or user group understand that it is possible that a bad actor may have compromised the tablet computer and could have surreptitiously loaded malicious code that may record images and conversations and/or may distribute the images and conversations to others. A tablet computer according to the present invention that gets compromised by a hacker but requires the add-on module for camera and/or microphone functionality is much safer than a tablet computer with the integral, built-in camera and microphone because it would only be possible for the recording or live transmission over the computer network when the add-on module is in the device so the user can at least be assured of privacy when the add-on module is not in the device.

As explained above, the smart mirror of the present invention is specifically designed to be as low-profile and as thin as possible. It is designed to seamlessly blend into the surface on which it is mounted, so that it is aesthetically pleasing and gives the appearance of being a part of the surface on which it is mounted. With advancements in technology, the smart mirror could become even thinner with the same components and functionality. Eventually, with the alternative display options discussed below, it may be possible for the front surface of the smart mirror to be less than a quarter inch from the base thickness ($d_m<\frac{1}{4}"$). The smart mirror seamlessly attaches to the user's existing larger mirror which gives the user the ability to display information via a smart mirror while allowing them to continue using their original mirror and avoiding the cost of buying a large smart mirror to replace their existing standard mirror. This also saves the cost of removing the standard mirrors and any renovation that may be necessary to install a large smart mirror with all of its electronics. Accordingly, the present invention results in a significantly more affordable smart mirror with all of the functionality of the original standard mirror.

Figure 3B:
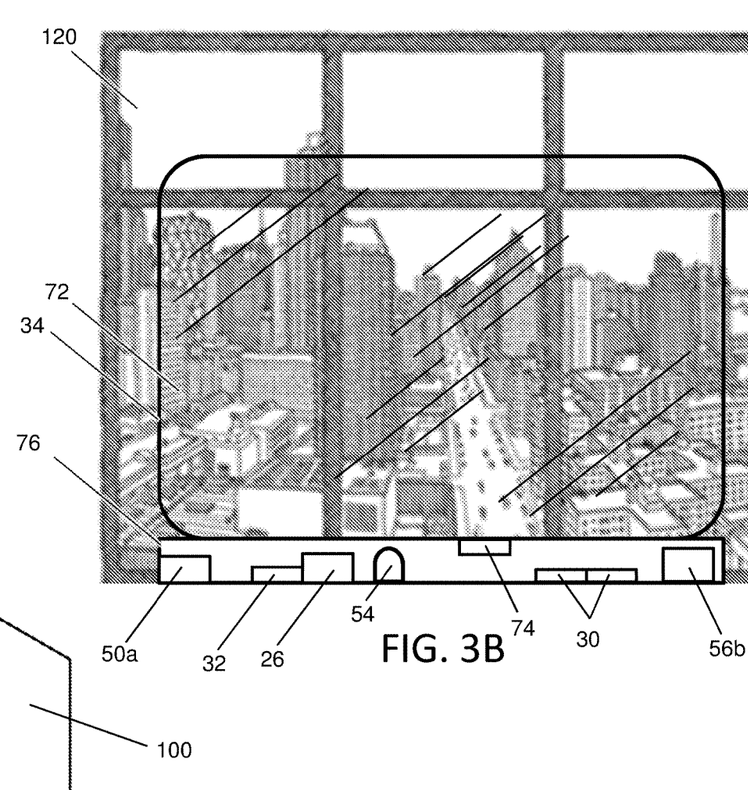
FIG. 3B depicts transparent display technology applicable to the invention described herein.
Figure 3C:
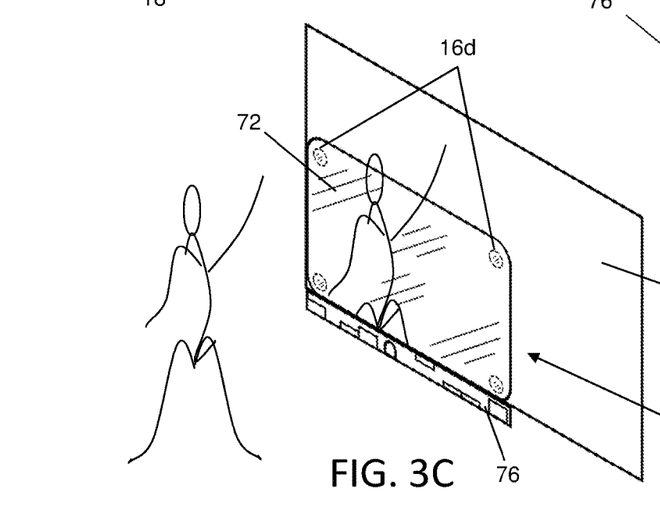
FIG. 3C depicts a transparent display smart mirror according to the invention described herein.

To further reduce the thickness of the mirror, it could be possible to remove the computing-components and circuit boards, except for the display screen itself, from the back of the mirror and place the components and circuit boards into a remote-box, such as shown in FIGS. 3B and 3C. All of the electronics boards related to processing and driving the display would be moved and could send their commands either via a single cable or perhaps even wirelessly. By moving the electronics, the smart mirror would be its thinnest possible with the thinnest low-profile connectors.

FIGS. 3B and 3C show an alternative design with a transparent display 72 that can be placed in front of a standard background 120 or may be fastened to the front of a base mirror 100 to function as a smart mirror. Advancements have been made in transparent display technology to the point where these types of technologies are being used commercially and provide a transparent screen in operative communication with a display module 74 housed within a housing 76 along with other processing proximate to the screen and which displays traditional content when powered on but which shows the mirror 100 and/or another background 120 through the transparent screen when the display is powered off as illustrated in FIG. 3B. Although the housing for the electronic modules is shown beneath the transparent display, it will be appreciated that the housing could be positioned at other locations proximate to the display and may be operatively connected thereto by any of the communication means described herein.

As shown in FIG. 3C, this transparent display technology could be utilized for the smart mirror design; by simply placing what is essentially a thin sheet of transparent material over an existing mirror to maintain the reflective properties of the mirror, one can then have the ability to display information but maintains the functionally of the mirrored base when powered off. Once again this lends to the desirable thinness of mirror modules when being placed onto an already-existing mirror. With a transparent display, there may not be any mirror layer or it might be applied as a layer on the back of the display screen. This way, the smart mirror is as thin as the thinnest possible display screen and the thinnest low-profile connectors when the smart mirror is going to be releasably connected to a standard mirror. Furthermore, the connectors 16d attaching the smart mirror to the base would be visible through the transparent screen and would preferably have a mirrored interior-facing surface so as to not disrupt the functionality of the base mirror when the screen is powered off. As evident from the integration of the transparent display smart mirror described above, the transparent display's electronics are located elsewhere than behind the screen as compared with the location of the standard smart mirror's electronics.

The smart mirror according to the present invention can be used in the home, in salons, in gyms as well as other locations where smart mirrors have been used, such as in public restrooms. The benefit of the present invention is its security in privacy as well as its ability to easily be placed over existing larger mirrors rather than having to incur the expense of replacing the entire mirror with a large, expensive smart mirror.

Figure 4B:
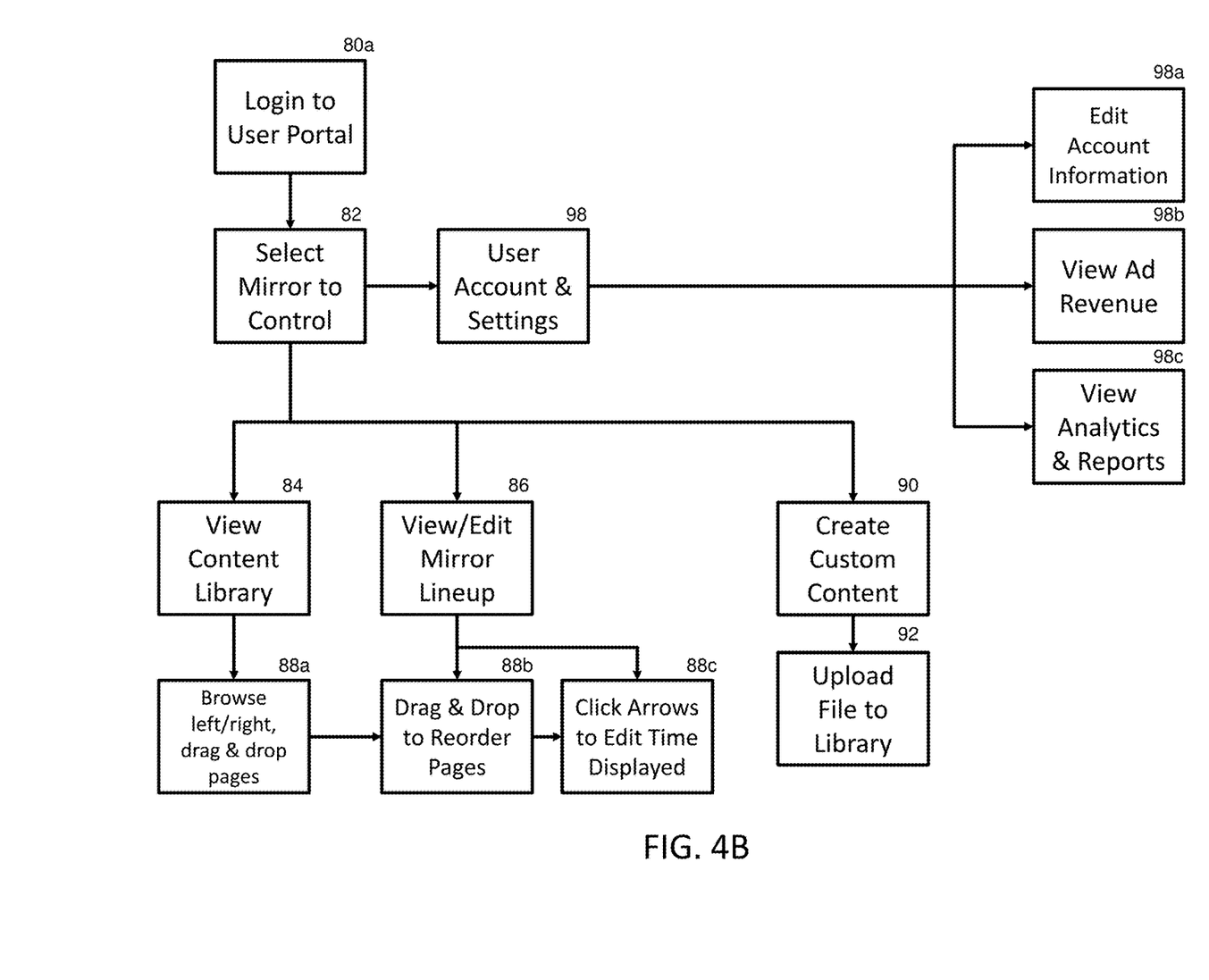
FIG. 4B is a flowchart of a user portal software application for user customization of the smart mirror according to the invention described herein.
Figure 5A:
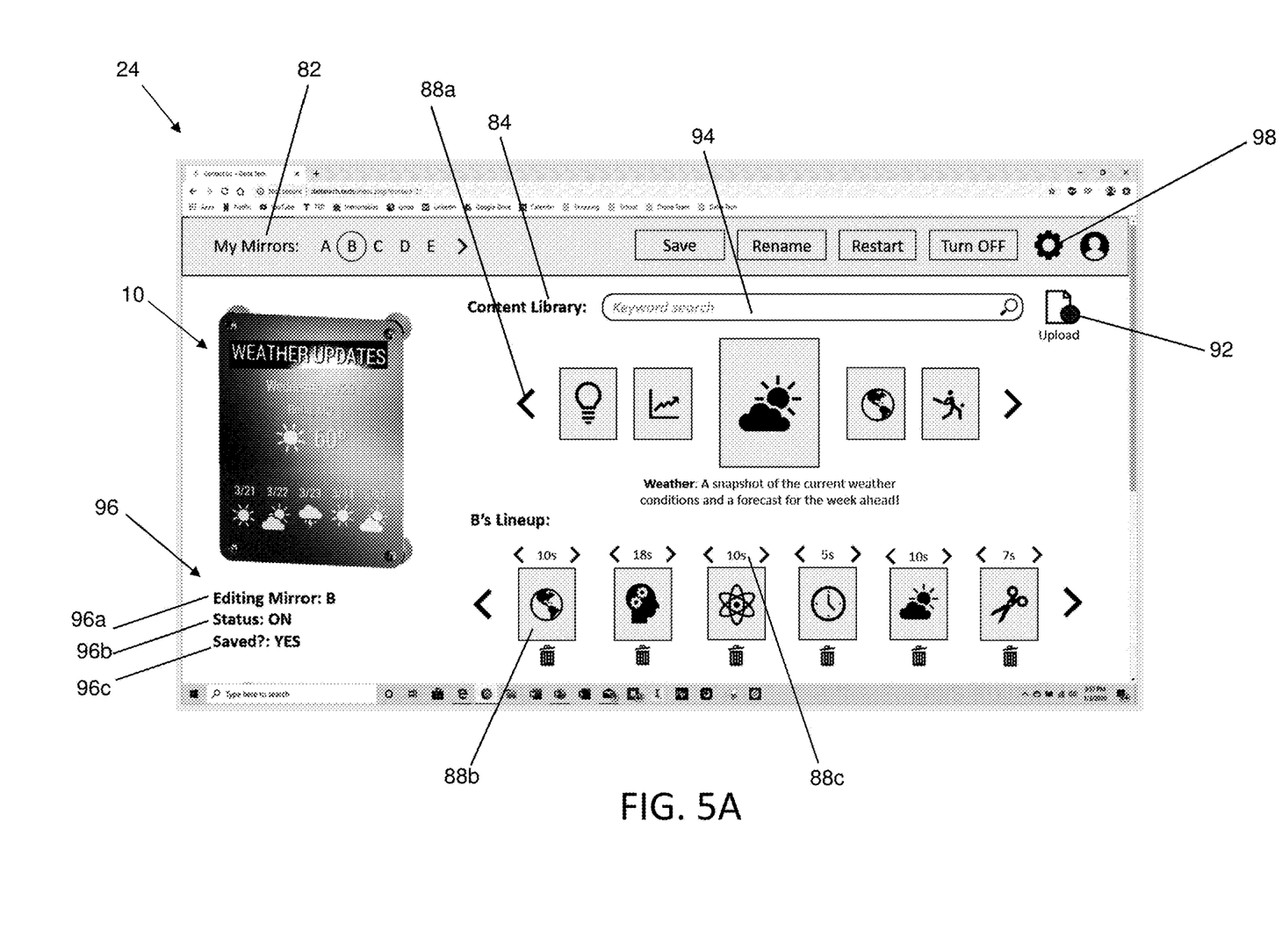
FIGS. 5A and 5B show screenshots of the user portal software application according to the invention described herein.
Figure 5B:
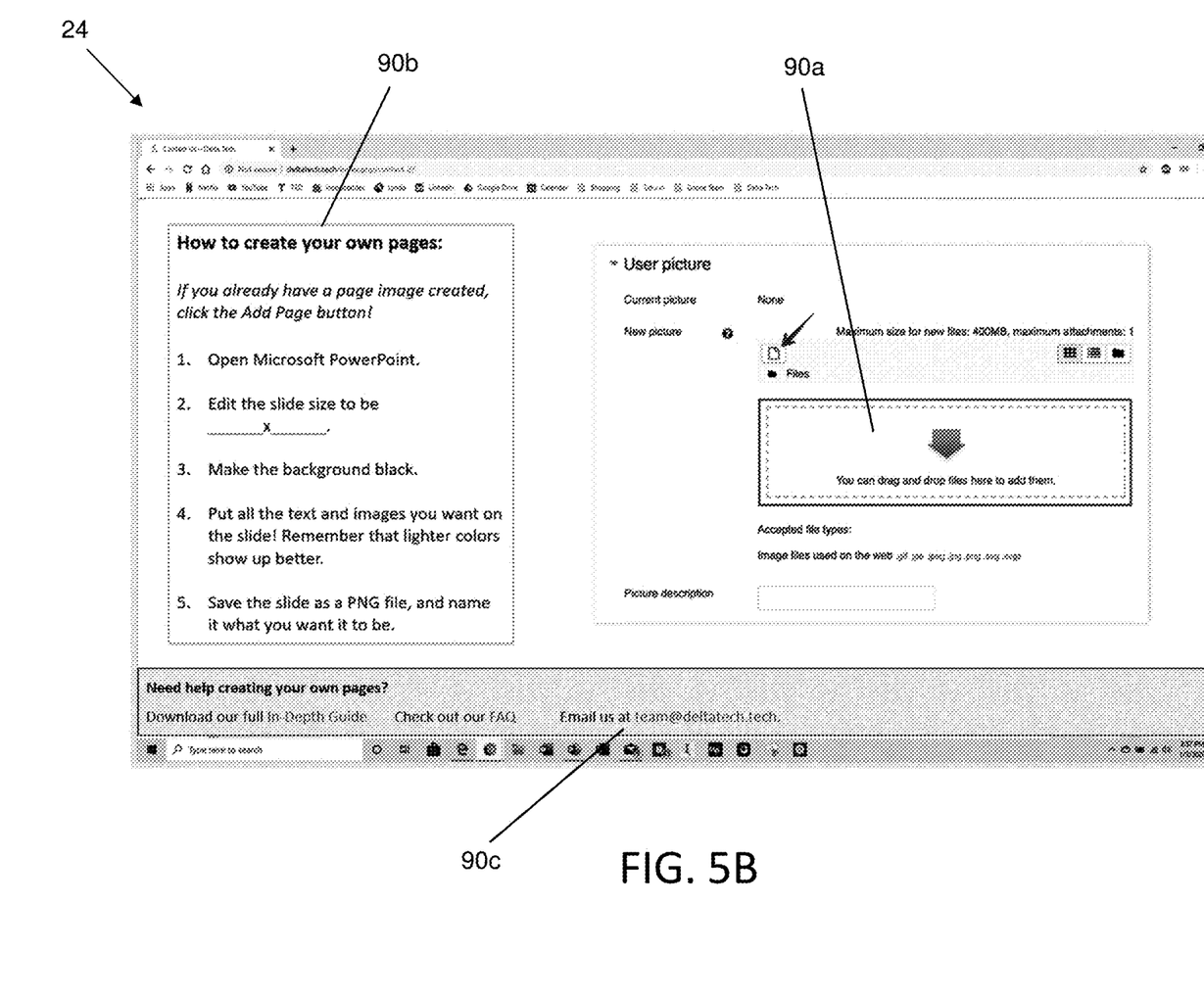

The present invention also includes a user portal software application having an online configuration webpage 24 for the smart mirrors which allows users to control the content displayed on their smart mirrors. The content library is accessed from the webpage which allows the user to access mirrors linked to their account individually or as a group, select which pages of content are displayed on the smart mirror and select the lineup and time period for each selected page. A schematic diagram of the smart mirror in networked communication to the software application is shown in FIG. 4A, and a flowchart of the software system is shown in FIG. 4B, and representative pages of the user portals are shown in FIGS. 5A and 5B. Users are able to login 80a, view their owned smart mirrors 82 by unit ID 82a, location 82b or any other identification method, and easily control what content is shown when and for how long. Furthermore, the user could select groups of units to change configurations for a set of mirrors, such as when multiple units are used within a single location. The user portal first prompts the user to enter their credentials and to login, then they can view their owned smart mirrors and what content is scheduled to be playing on each smart mirror as well as their account settings 98.

The user can browse the 'content library' 84, which offers them a wide range of template pages 84a that can be dragged and dropped 88a into their smart mirror's lineup. Each page, when hovered over, is previewed on a mock-mirror so that the user can see what the page looks like in full detail. From the configuration webpage the user can browse different types of pages and can search for specific genres within a search bar 94, such as news, weather, entertainment, fashion or other categories that may be applicable to the particular user. Their smart mirror's lineup can also be viewed and edited 86 where they can add or remove pages, rearrange the order of pages 88b, and set how long each page is to be displayed 88c.

After editing their smart mirror's lineup, the user saves any changes made and these changes are pushed by the system to the mirror, which would then perform a restart to begin displaying the new lineup. Further, a status board 96 shows the mirror or set of mirrors that are being edited 96a, their current status 96b and whether changes have been saved 96c as editing is being completed. The user portal can also allow users to view their account information and settings 98 and manage account information 98a, view ad revenue 98b and review analytics for their smart mirrors and generate reports 98c all from a dashboard. For example, users can control their account information and settings from the dashboard and can generate reports for each mirror or the system as a whole which may include but is not limited to historical lineups, runtime data, performance data, and network or system issues.

In addition to managing available content, the users can also create their own custom content 90 through the configuration webpage, such as uploading a user image 90a as illustrated in FIG. 5B, that may be included in the user lineup. Basic instructions 90b are provided within the content creation so that users can quickly add custom content. Further, a full how-to guide may be available for download which would include pictures and more details for more complex content creation, such pages having animations and video. After creation upload, the user would be able to preview the page to be sure that everything is looks correct and can request support additional services from the host support team 90c. This file would then simply be uploaded 92 to their content library to be dragged and dropped into their smart mirror's lineup.

Accordingly, the present invention allows users to releasably attach a low-profile smart mirror directly to any existing larger mirror or other base structure that has a flat surface. This allows the user to keep their existing standard mirrors and allows them to choose where they want the smart mirror to be placed. The absence of an integral, built-in camera and microphone into the smart mirror's tablet computer allows for the highest level of privacy, and the ability to incorporate add-on modules for camera and microphone functionality allows the user to use the devices when desired. The user portal software provides additional functionality to the smart mirrors because users can control and customize the content that is delivered to their smart mirrors.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, it will be appreciated that the smart mirror of the present invention could be placed not just over a larger mirror or a window pane but because of the connectors and design of the portable smart mirror, the smart mirror in the present invention could be connected to and moved to various structures with surfaces that are large enough and smooth enough to accommodate the connectors described herein. Without presenting an exhaustive list of possible mounting locations, it will be appreciated that the smart mirror with the connectors could also mount to refrigerators, door panels, lockers, kiosks, and walls, including a shower wall when the tablet computer is in a hermetically sealed housing or an otherwise watertight case. Thus, the breadth and scope of the present invention should not be limited by any of the above-described exemplary embodiments, but should be defined only in accordance with the following claims appended hereto and their equivalents.

What is claimed is:

1. A low-profile smart mirror for connection to a front side of a larger mirror and for communication with a computer network, comprising:
a tablet computer comprising a processor, a power supply electrically connected to the processor, an external communications module in operative communication with the processor, a memory in operative communication with the processor, a display screen facing towards a front surface of the tablet computer and operatively connected to the power supply and controlled by the processor, and a backside panel enclosing the processor and the memory within an interior space between the backside panel and the display screen, wherein the tablet computer has a first thickness, wherein the tablet computer does not include an integral camera module, and wherein the tablet computer does not include an integral microphone module;
a mirror mounted to the tablet computer and disposed in front of the display screen, wherein the mirror is comprised of a base layer, a semi-transparent reflective layer, and a transparent protective layer, wherein the mirror extends over the entirety of the display screen, and wherein the mirror does not have any border frame;
a connector comprising an outward-facing side, an inward-facing side, and a second thickness between the outward-facing side and the inward-facing side, wherein the second thickness is less than the first thickness; and
a fastener attaching the inward-facing side of the connector to the backside panel.

2. The low-profile smart mirror of claim 1, wherein the tablet computer is further comprised of a frame attached to the backside panel and surrounding the display screen and an integral speaker operatively connected to the power supply and controlled by the processor, wherein the connector is selected from the group of low-profile connectors consisting of an adhesive gel pad layer, a synthetic setae layer, one layer side of a hook and loop fastener, a magnetic layer, an adhesive layer on a flexible carrier, and a suction cup diaphragm.

3. The low-profile smart mirror of claim 2, wherein the external communications module is at least one of a wired interface and a wireless interface, wherein the wired interface is further comprised of a plurality of data pins and a plurality of power pins, wherein the fastener is at least one of an adhesive fixed to the inward-facing side of the connector, a bracket aperture in the backside panel holding a suction cup post, and a screw extending through the backside panel attached to the suction cup post, wherein the frame extends from the backside panel forward past the panel display screen to the front surface of the tablet computer, wherein the frame attaches to the back of the mirror at a spaced distance from the display screen to form an open space between the display screen and the mirror, and wherein a periphery of the mirror is cantilevered beyond the display screen by a distance greater than a thickness of the mirror.

4. The low-profile smart mirror of claim 2, further comprising at least one of another layer side of the hook and loop fastener attached to a front side of the larger mirror and a ferromagnetic material attached to at least one of the front side and a back of the larger mirror.

5. The low-profile smart mirror of claim 1, further comprising an inductive charger, wherein the inductive charger is comprised of a primary coil and a transmitter circuit, wherein the power supply of the tablet computer is further comprised of a secondary coil, a receiver circuit, and a rechargeable battery, and wherein the inductive charger is mounted to the larger mirror adjacent to the secondary coil in the tablet computer.

6. The low-profile smart mirror of claim 1, wherein the external communications module is further comprised of a peripheral port for non-networked communications and a networked computer protocol for networked communications between the processor and the computer network, and wherein the processor, the power supply, and the peripheral port are attached to a back of the display screen.

7. The low-profile smart mirror of claim 6, further comprising a plugin peripheral device in operative communication with and controlled by the processor through the peripheral port in the external communications module, and wherein the peripheral device is at least one of a plugin camera module, a plugin microphone module, and a plugin camera and microphone module.

8. The low-profile smart mirror of claim 1, wherein the backside panel further comprises a recessed section and a panel thickness between a panel inward-facing surface and a panel outward-facing surface, wherein the recessed section comprises a recessed surface surrounded by a sidewall, wherein the recessed surface is recessed a depth from the panel outward facing-surface, wherein the depth is less than one half of the panel thickness and is less than the second thickness, and wherein at least a portion of the connector proximate to the inward-facing surface is seated within the recessed section of the backside panel.

9. The low-profile smart mirror of claim 1, further comprising an online configuration webpage in networked communication with the processor, wherein the online configuration webpage provides a plurality of template content items, and wherein the processor populates the display screen with a first selection of at least one of the template content items.

10. The low-profile smart mirror of claim 9, wherein the online configuration webpage further provides a lineup option for ordering the plurality of template content items, wherein the lineup option is comprised of a set of display time periods for corresponding template content items, and wherein the processor sequentially populates the display screen with a second selection of the template content items according to the display time periods in the lineup option.

11. A low-profile smart mirror for connection to a front side of a larger mirror and for communication with a computer network, comprising:
  a tablet computer comprising a processor, a power supply electrically connected to the processor, an external communications module in operative communication with the processor, a memory in operative communication with the processor, a display screen facing towards a front surface of the tablet computer and operatively connected to the power supply and controlled by the processor, an integral speaker operatively connected to the power supply and controlled by the processor, and a backside panel enclosing the processor and the memory within an interior space behind the display screen, wherein the backside panel comprises a panel inward-facing surface, a panel outward-facing surface and a recessed section, wherein the recessed section comprises a recessed surface surrounded by a sidewall, wherein the recessed surface is recessed a depth from the panel outward-facing surface, wherein the external communications module is further comprised of a peripheral port for non-networked communications and a networked computer protocol for networked communications with the computer network;
  a mirror mounted onto the tablet computer and disposed in front of the display screen;
  a connector comprising an outward-facing side and an inward-facing side, and wherein at least a portion of the connector proximate to the inward-facing surface is seated within the recessed section of the backside panel; and
  a fastener attaching the inward-facing side of the connector to the backside panel.

12. The low-profile smart mirror of claim 11, further comprising at a plugin peripheral module in operative communication with and controlled by the processor through the peripheral port in the external communications module, wherein the tablet computer does not include an integral camera module, and wherein the tablet computer does not include an integral microphone module, and wherein the plugin peripheral module is selected from the group consisting of a plugin camera module, a plugin microphone module, and a plugin camera and microphone module.

13. The low-profile smart mirror of claim 11, wherein the tablet computer further comprises a first thickness, wherein the mirror is comprised of a base layer, a semi-transparent reflective layer, and a transparent protective layer, wherein the mirror extends over the entirety of the display screen, wherein the connector further comprises a second thickness between the outward-facing side and the inward-facing side, wherein the backside panel further comprises a panel thickness between the panel inward-facing surface and the panel outward-facing surface, wherein the depth of the recessed section is less than one half of the panel thickness, and wherein the second thickness is less than the first thickness.

14. The low-profile smart mirror of claim 13, wherein the connector is selected from the group of low-profile connectors consisting of an adhesive gel pad layer, a synthetic setae layer, one layer side of a hook and loop fastener, a magnetic layer, an adhesive layer on a flexible carrier, and a suction cup diaphragm, wherein the depth of the recessed section is less than the second thickness of the connector, and wherein a periphery of the mirror is cantilevered beyond the display screen by a distance greater than a thickness of the mirror.

15. The low-profile smart mirror of claim 13, wherein the power supply is selected from the group of power devices consisting of an inductive charging coil, a charging port and jack, a rechargeable battery, and any combination thereof, wherein the processor, memory, and integral speaker are attached to a motherboard mounted on a back of the display screen in the interior space, and wherein the second thickness of the connector is less than the thickness of the mirror.

16. The low-profile smart mirror of claim 11, further comprising an online configuration webpage in networked communication with the processor, wherein the online configuration webpage provides a plurality of template content items, wherein a selection of at least one of the template content items on the online configuration webpage, and wherein the processor populates the display screen with the selection of the template content items.

17. A low-profile smart mirror for connection to a front side of a larger mirror and for communication with a computer network, comprising:
  a tablet computer comprising a processor, a power supply electrically connected to the processor, an external communications module in operative communication with the processor, a memory in operative communication with the processor, a display screen facing towards a front surface of the tablet computer and operatively connected to the power supply and controlled by the processor, an integral speaker operatively connected to the power supply and controlled by the processor, and a backside panel enclosing the processor and the memory within an interior space behind the display screen, wherein the external communications module is further comprised of a peripheral port for non-networked communications and a networked computer protocol for networked communications with the computer network, wherein the tablet computer does not include an integral camera module, and wherein the tablet computer does not include an integral microphone module;
  a mirror mounted onto the tablet computer and disposed in front of the display screen;
  a connector comprising an outward-facing side and an inward-facing side;
  a fastener attaching the inward-facing side of the connector to the backside panel;
  a plugin peripheral camera module in operative communication with and controlled by the processor through the peripheral port; and
  a plugin peripheral microphone module in operative communication with and controlled by the processor through the peripheral port.

18. The low-profile smart mirror of claim 17, wherein the tablet computer further comprises a first thickness, wherein the mirror is comprised of a base layer, a semi-transparent reflective layer, and a transparent protective layer, wherein the mirror extends over the entirety of the display screen, wherein the connector further comprises a second thickness between the outward-facing side and the inward-facing side, wherein the second thickness is less than the first thickness, wherein the backside panel further comprises a recessed section and a panel thickness between a panel inward-facing surface and a panel outward-facing surface, wherein the recessed section comprises a recessed surface surrounded by a sidewall, wherein the recessed surface is recessed a depth from the panel outward facing-surface, wherein the depth is less than one half of the panel thickness and is less than the second thickness, and wherein at least a portion of the connector proximate to the inward-facing surface is seated within the recessed section of the backside panel.

19. The low-profile smart mirror of claim 17, wherein a periphery of the mirror is cantilevered beyond the display screen by a distance greater than a thickness of the mirror.

20. The low-profile smart mirror of claim 17, further comprising an online configuration webpage in networked communication with the processor, wherein the online configuration webpage provides a plurality of template content items, wherein a selection of at least one of the template content items on the online configuration webpage, and wherein the processor populates the display screen with the selection of the template content items.

* * * * *